United States Patent [19]

Demellayer

[11] Patent Number: 4,825,030
[45] Date of Patent: Apr. 25, 1989

[54] DEVICE AND PROCESS FOR PREVENTING THE BREAKING OF A METAL WIRE

[75] Inventor: René Demellayer, Geneve, Switzerland

[73] Assignee: Charmilles Technologies S.A., Meyrin, Switzerland

[21] Appl. No.: 140,389

[22] Filed: Jan. 4, 1988

[30] Foreign Application Priority Data

Jan. 13, 1987 [CH] Switzerland ............................. 95/87

[51] Int. Cl.⁴ .................. B23H 7/02; G01B 13/08
[52] U.S. Cl. .................................. 219/69.12; 73/37.7; 73/160
[58] Field of Search .............. 73/37.6, 37.7, 160; 219/69 W, 69 D, 69 S, 69 R; 204/206

[56] References Cited

U.S. PATENT DOCUMENTS

| 532,319 | 2/1976 | Stern | 73/37.7 |
|---|---|---|---|
| 3,543,562 | 12/1970 | Clemenceau | 73/37.7 |
| 3,593,566 | 7/1971 | Loopuyt | 73/37.7 |
| 3,885,417 | 5/1975 | Stern | 73/37.7 |
| 4,306,450 | 12/1981 | Moser | 73/37.7 |

FOREIGN PATENT DOCUMENTS

| 52-5591 | 1/1977 | Japan | 73/37.7 |
|---|---|---|---|
| 59-42218 | 3/1984 | Japan | 219/69 C |

*Primary Examiner*—A. D. Pellinen
*Assistant Examiner*—Geoffrey S. Evans
*Attorney, Agent, or Firm*—Gifford, Groh, Sheridan, Sprinkle and Dolgorukov

[57] ABSTRACT

Device placed at the outlet of a machining zone and having an outflow gauge equipped with two barrels in which a metal wire passes, an electrical current running through the wire which travels under tension between two guides, a pumping installation injecting a machining fluid under pressure through an opening of this guage, an element mounted at another opening of the gauge to measure the outflow of this fluid between wire and barrel, a transducer converting this measurement into an electrical variable, and a comparator suitable for sending a signal to a control unit when this measurement reaches or surpasses a reference value. The control unit is arranged for controlling a pulse generator to change at least one machining parameter in such a way as to bring the measurement of the outflow to or to below the reference value. This device is useful for monitoring the variation in the cross-section of the wire and preventing its breaking.

17 Claims, 3 Drawing Sheets

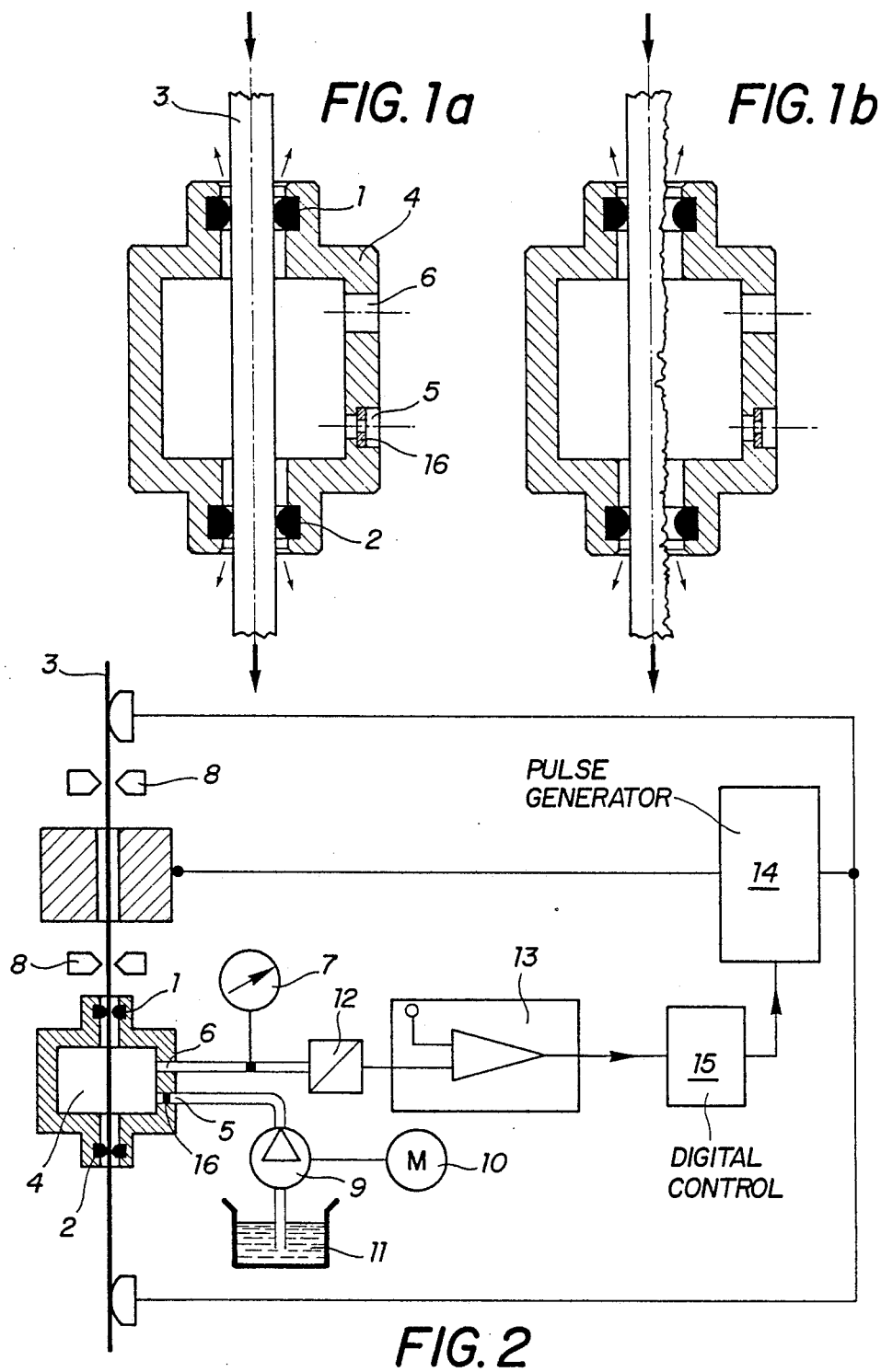

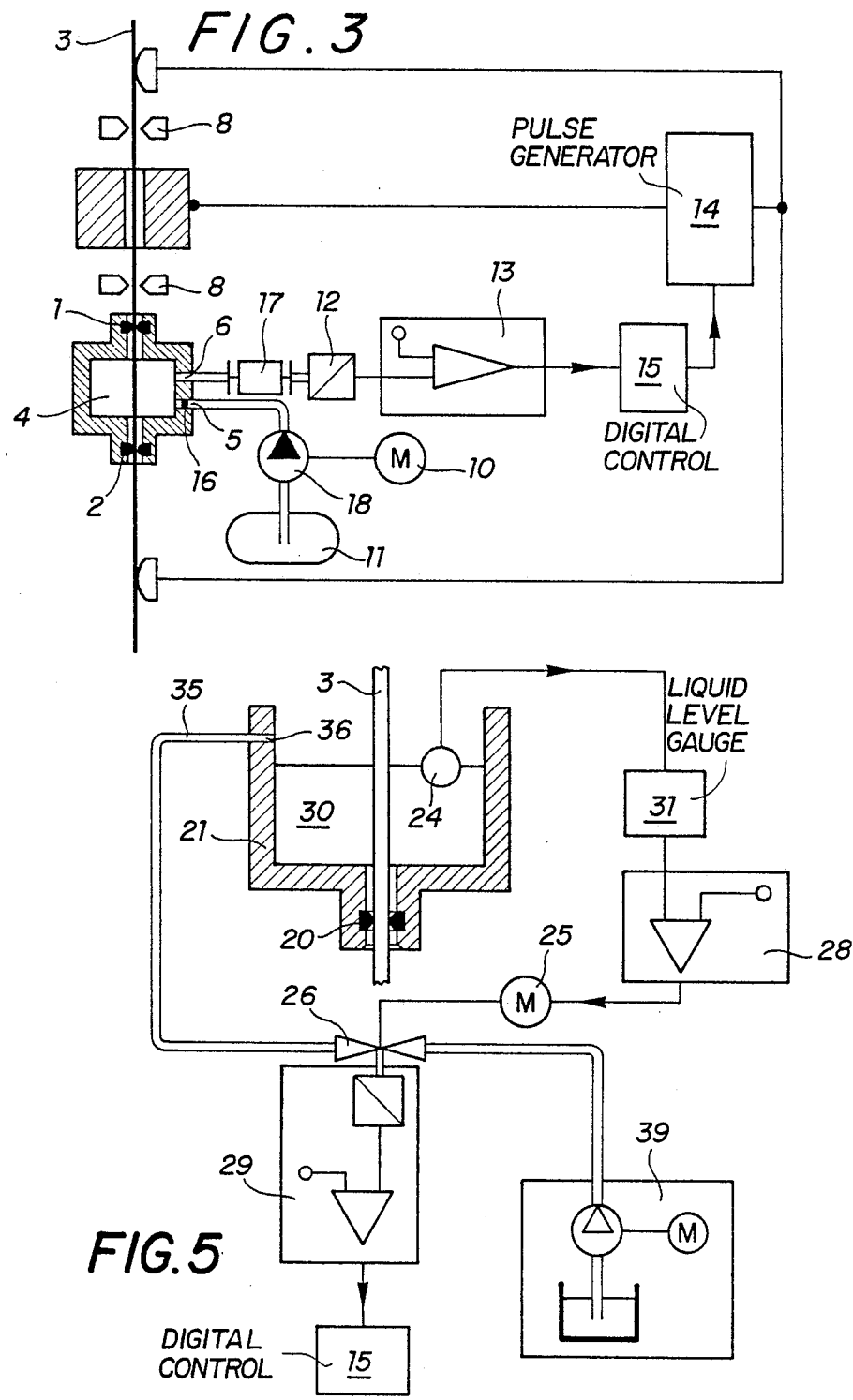

DEVICE AND PROCESS FOR PREVENTING THE BREAKING OF A METAL WIRE

BACKGROUND OF THE INVENTION

The present invention deals with a device and a process for preventing the breaking of a metal wire passing between two guide elements. Such a device proves particularly useful in the field of electroerosion, for cutting machines equipped with a wire electrode.

Actually the wire electrode of a machine for cutting by electroerosion is subjected to great wear during its passage through the machining zone. This wear is due to the intense sparking undergone by the wire in this zone and likewise to friction on the guide and the power lead contact located upstream, this effect being increased further by the fact of heating up of the wire due to the machining electric current which passes through it and by the pull applied to it.

The surface of the wire becomes more and more uneven, which leads to an increase in the friction on the guide and the power lead contact located downstream. Moreover, its cross-section changes asymmetrically from one point to another of its length. Generally this involes a thinning of the wire, which increases its temperature rise by the Joule effect and which results, as well as the change in its surface condition, in a reduction of its mechanical resistance. As described in British Pat. No. 2,045,671, these local reductions in diameter are accompanied by excrescences which appear on their edges and sometimes greatly exceed the original cross-section of the wire. These excrescences "hang" on the wire guide downstream and induce lateral displacements of the wire, which increase the danger of short circuits and thus, for both of these reasons, increase the probability of breaking of the wire.

For a long time, by examining the wire coming out downstream from the machining zone, the practitioners of electroerosion have known how to predict a probable break in the wire by observing the increase in its unevenness and in the reduction in its diameter which are generally recognizable with the naked eye. It is known that when the wire takes on a certain appearance, there is reason to reduce the frequency of the electrical discharges so as to avoid the break.

This roughness of the wire increases during the machining, even though the wire passing into the machining zone is constantly renewed and the machining parameters remain constant and had been chosen at the start so as to obtain a substantial erosion of the piece and a low erosion of the wire. Indeed, the machining conditions deteriorate in the course of time in an unpredictable manner. Thus, filters may become plugged up, pumps may become less effective, thus changing the characteristics of the dielectric fluid in which the piece to be machined and the wire electrode are bathed. Leaks may occur which lower the effectiveness of the nozzles injecting the machining fluid, which results in a loss in pressure and thus a poor removal of the metal particles eroded and a poor cooling of the wire electrode. Thus it is desirable to alleviate this deterioration of the machining and this abnormal and irregular wear on the wire.

This is why it has been attempted to detect automatically and less empirically the state of deterioration of the wire, making it possible to detect its imminent break by measuring the variation in a physical characteristic of the wire following its passage through the machining zone. Thus, some of the known processes make use of monitoring the wear on the wire during the electroerosion by, for example, detecting the increase in unevenness by an optical method, in particular by measuring its specular reflectance (Japanese patent application published as No. 54-71496) or by a mechanical method, by means of a sensor element (Japanese patent application published as No. 59-219119). But these methods do not allow for the twisting movement of the wire which has the effect of continuously changing the orientation of the deteriorated zone and thus interferes with the monitoring measurements.

Other known methods consist in monitoring the decrease in the cross-section of the wire by measuring its resistivity (Japanese patent application published as No. 59-102 529) or its magnetic characteristics (Japanese patent application published as No. 60-29 222).

However, since variations in resistivity and magnetic effects can also be caused by a variation in the temperature of the wire and not by a change in its cross-section, the interpretation of the results of these measurements remains very uncertain, and does not make it possible to foresee or prevent effectively the break of the wire.

The present invention has as its object a device intended to prevent the breaking of a metal wire passing under tension between two guide elements, particularly in the case of a wire electrode stretched between the two machining heads of a machine for cutting by electroerosion and with a machining current passing through it. Thanks to this device, the progressive wear on the wire can be monitored by measuring the variation with time of its cross-section at the outlet of the machining zone. According to the device of the present invention the wire passes through an element of the type of rings with jets or an outflow gauge equipped with at least one barrel, or into a wire passed through an organ caliber of a pneumatic gauge disposed for example at the outlet of the machining zone of an EDM machine which makes it possible to measure the leakage of a fluid injected under pressure, either between the wire and the barrel or the wire and the ring, or else at the outlet of calibrated openings or of sensors arranged on either side of the wire.

This device is likewise arranged in such a way as to change automatically, when this measurement reaches a given threshold, at least one of the machining parameters the variation in which is suitable for reducing the wear on the wire.

The present invention likewise deals with a process using the device as defined above.

"Barrel" is understood to mean a calibrated opening arranged at the outlet of a leakproof case.

"Measuring the leakage" is understood to mean "measuring the pressure or the flow rate" of the fluid passing through the barrel or the ring or between the calibrated openings or the sensors arranged on either side of the wire. This fluid may be a gas or a liquid. Electroerosion preferably involves a dielectric machining liquid, but air or another gas may also be used. Thanks to an electronic circuit, it is possible for example to compare each measurement at each instant to a reference value and to cause at least one machining parameter defined below to vary in such a way as to restore the deviation between the measurement and the reference value to below a given threshold. It is likewise possible at the same time to make a measurement upstream from the machining zone and to compare the deviation between the two measurements obtained respectively upstream and downstream with a reference deviation and then, when it reaches or surpasses this reference value, to act on an appropriate machining parameter in such a way as to bring this deviation to below the reference value. These thresholds, deviations and reference values may be determined experimentally or by theoretical calculation.

The response time of these measurements is very short. The appearance of an abnormal wear may generally be detected in less than several tenths of a second. The return to normal wear conditions is generally done in less than several seconds.

Preferably a machining parameter is chosen which can be acted on rapidly and a change in which can rapidly reduce the wear on the wire. The parameter may also be the speed of passage of the wire, that is the duration of its passage through the machining zone, or else pull between the guide elements or even one of the characteristics of the injection of the machining liquids. In electroerosion it is preferable to act on the power of the electrical discharges, in particular on their frequency or their intensity. It is likewise possible to act on the machining conditions by also varying the delay period of the pulses, the duration or frequency of the sparks, the voltage at the terminals of the generator, or else control a series of short interruptions in the pulses.

The measurements thus made according to the device and the process of the present invention give a reliable indication of the reduction in the mean cross-section of the wire and thus of its degree of wear.

In contrast to the different devices and processes proposed in the state of the art, the present invention makes it possible to detect accurately the appearance of a process of abnormal wear on the wire, and this regardless of the orientation or the temperature of the latest.

The device of the present invention may assume numerous embodiments. Only certain ones will be illustrated diagrammatically as an example in the annexed drawings.

BRIEF DESCRIPTION OF THE DRAWINGS

FIGS. 1A and 1B show a longitudinal section of an outflow gauge which can be used in a device according to the present invention.

FIG. 2 diagrammatically shows a circuit in which a device according to the present invention makes it possible to measure the pressure of the fluid passing through the barrel mounted at the outlet of an outflow (or leakage) gauge arranged downstream machining zone of an EDM machine for cutting.

FIG. 3 represents a circuit in which a device according to the present invention makes it possible to measure the flow rate of the fluid passing through the barrel placed at the outlet of an outflow gauge placed downstream from the machining zone of an EDM cutting machine.

FIG. 5 is a longitudinal section of an outflow gauge different from the one shown diagrammatically in FIGS. 1A and 1B which may likewise be used in a device according to the present invention.

DETAILED DESCRIPTION OF THE PREFERRED EMBODIMENTS OF THE PRESENT INVENTION

Figure 4:
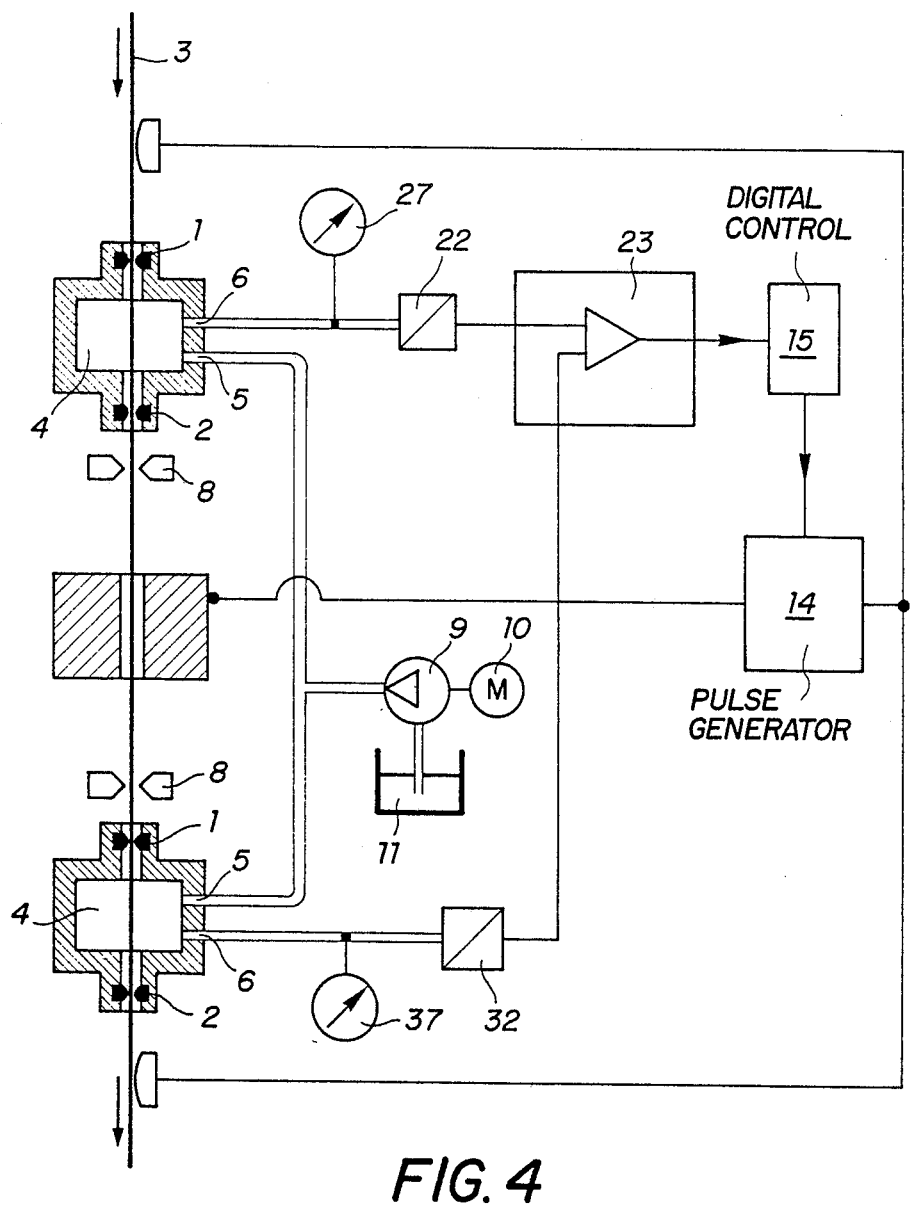
FIG. 4 diagrammatically shows a circuit in which a device according to the present invention makes it possible to make two measurements simultaneously, one upstream and one downstream from the machining zone of an EDM cutting machine.

The outflow gauge represented in FIG. 1 has two barrels 1 and 2 showing a diameter of some tenths of millimeters, preferably slightly greater, for example by several microns, than the diameter of the wire 3 the wear of which it is wished to monitor. They are made of diamond or of sapphire or of another hard material such as certain ceramics, not deformable and resistant to friction. They a are mounted in two openings provided in two ends of a leakproof case 4 and permits the wire 3 to travel the gauge. Liquid is injected under pressure in the case 4 thanks to the channel 5 penetrating the side of the case 4. Another channel 6 makes it possible to mount on this case 4 either a manometer, a flowmeter or an outflow meter. The channel is provided with a diaphragm 16 intended to reduce the flow rate at the inlet of the gauge, in order to make the variations in pressure or in flow rate measured by this manometer or this flowmeter more sensitive. This diaphragm may be placed, as FIG. 1 indicates, in the wall of the case 4, but it may likewise be located at another place in the channel 5, between the opening made in the case 4 and the position where the manometer or the flowmeter is branched off.

FIG. 2 shows a device making it possible to regulate the machining parameters, for example the power of the electrical discharges during a machining by electroerosion, by measuring the pressure prevailing in the case 4 with an outflow gauge like that described in reference to FIG. 1 and placed on the wire electrode 3 at the outlet of the machining zone, that is on or close to the wire guide 8 downstream. There is a manometer 7 which is connected to the outflow gauge by the channel 6. The pumping element 9 driven by the motor 10 makes it possible to take machining liquid out of the reservoir 11 and inject it under pressure into the case 4 through the channel 5. The transducer 12 converts the pressure measurement made by the manometer 7 into an electrical value. The comparator 13 mounted between this transducer 12 and the digital control 15 of the EDM machine compares this value with a predetermined reference value. If the latter is reached or surpassed, it transmits and amplifies a signal which it sends to the digital control 15, which is itself connected to the pulse generator 14 of the EDM machine.

We shall describe the operation of this device in reference to FIGS. 1 and 2. It is sufficient to measure the pressure inside the case 4 at the start of the machining cycle, when the wire 3 still shows no abnormal wear, in order to know the conditions corresponding to a wire which is not worn and to the gauge and the machining fluid used (FIG. 1a). The pumping element 9 is arranged in such a way as to inject this fluid at a constant flow rate, while the manometer 7 makes successive measurements of the pressure prevailing in the case 4. These measurements indicate that the pressure decreases in the course of time, this drop in pressure being due to an increase in the leaks at the openings 1 and 2 due to a decrease in the cross-section of the wire 3, and thus of an increase in its wear (FIG. 1b).

When the pressure reaches a predetermined threshold (which is an indication signifying that the wire 3 is starting to be worn to such a degree that it is in danger of breaking), a signal is transmitted by the comparator 13, automatically setting off the transmission to the generator 14 of a command from the digital control 15, which itself for example commands a decrease in the frequency or intensity of electrical discharges, or another change in a parameter suitable for making the wear on the wire decrease rapidly. The control 15 may also act on several machining parameters.

FIG. 3 represents a device making it possible to regulate the machining parameters for example the power of the electrical discharges during a machining by electro-erosion, by measuring the flow rate of the fluid passing through the case 4 of an outflow gauge as described in the description of FIG. 1 and placed on the electrode wire 3 as described previously in reference to FIG. 2.

This is a flowmeter 17 which is connected to the gauge by the channel 6. The device has a pumping station (18, 10, 11) of the type described above. The transducer 12 converts the flow rate measurement made by the flowmeter 17 into an electrical variable. The comparator 13 plays the same part as in the device described above.

We shall describe the operation of this device in reference to FIGS. 1 and 3. It is sufficient to measure the flow of fluid circulating from the supply opening 5 to the downstream 2 or upstream opening 1 of the gauge illustrated in FIG. 1, at the start of the machining cycle, in order to know the flow rate corresponding to an unworn wire with a given diameter, as well as to the gauge and machining fluid used (FIG. 1a). The pumping element 18 is arranged in such a manner as to inject the fluid at a constant pressure while the flowmeter 17 makes successive measurements of the flow rate of the fluid passing through the outflow gauge. These measurements indicate that the flow rate increases in the course of time, this increase, as explained above, being due to an increase in the leaks at the orifices 1 and 2 by reason of an increase in the wear on the wire 3 (FIG. 1b). When this increase in flow rate reaches a predetermined critical threshold, a signal is delivered by the comparator 13, automatically setting off a decrease in the power of the electrical discharges, for example, or a change in one or more other parameters decreasing the wear on the wire.

Instead of being transmitted when the pressure or the flow rate vary beyond a predetermined reference value, the signal may also be transmitted when the increase in the flow rate or the decrease in the pressure accelerate during the time before reaching this threshold, which is a sign of an acceleration in the wear on the wire resulting from a deterioration of the machining conditions.

FIG. 4 illustrates a device in which two outflow gauges as described in FIG. 1 are arranged on either side of the machining zone, which makes it possible to compare the degree of wear of the wire upstream and downstream from the machining zone. A manometer (27 and 37) is mounted on each of the gauges. The pumping station 9, of the same type as the one described above in reference to FIG. 2, is connected to the channel 5 of each of the gauges and arranged in such a manner as to inject the machining fluid at a constant flow rate, while each of the manometers 27 and 37 at the same time measures the internal pressure prevailing in each of the cases 4. These two measurements are converted into electrical variables by the transducers 22 and 32 each connected to one of the manometers 27 and 37 as well as to a comparator 23. The latter has a differential amplifier arranged so as to compare the two electrical variables transmitted by each of the transducers 22 and 32 and to transmit a signal to the digital control 15 of the EDM machine when the deviation between these two variables reaches or surpasses a reference value. The latter has been predetermined in such a way as to signify an acceleration of the wear on the wire (and thus a deterioration of the machining conditions and a danger of breakage of the wire). The digital control 15 then transmits an instruction to the pulse generator 14 of the EDM machine to reduce the power of the electrical discharges, for example, or to change another or a number of other parameters reducing the wear on the wire.

It is well understood that the embodiments described above are not at all limiting in nature. It may be noted in particular that outflow gauges of a different type from that described in reference to FIG. 1 may be advantageously used in a device according to the present invention, for example elements of the type of rings with jets, or gauges such as that represented in FIG. 5.

This gauge shows only a single barrel 20 situated downstream. It consists of a vessel 21 holding a certain volume of fluid 30. A float 24 connected to a liquid level gauge 31 permits measuring the level of this fluid. A motor 25 activating a valve 26 is controlled by a signal transmitted by a comparator 28 in response to the deviation between the liquid level measurement and a reference value for this level. Due to this valve 26 arranged on the fluid supply channel 35 opening into the vessel 21 through the opening 36, between this opening and a fluid pumping station 39 (for example one of the type of that described in reference to FIGS. 2 to 4), a constant level is maintained in the vessel 21. The position of this valve 26 is a measure of the leaks between the wire 3 and the barrel 20, that is it makes it possible to evaluate and monitor the variation in the cross-section of the wire 3. The position of the valve 26 is compared by a comparator 29, into which may be incorporated for example a flowmeter and a hydraulic-electric transducer, with a reference value. This latter is for example determined experimentally at the start of the machining for an unworn wire. When this deviation reaches or surpasses a predetermined threshold the comparator 29 delivers and amplifies a signal to the control unit 15 so that the latter will control the change in at least one machining parameter suitable for reducing the wear on the wire 3. A gauge of this type may for example be used in the case of machining conducted with lubrication by spraying.

Instead of using outflow gauges or rings with jets, monitoring sensors can be used consisting particularly of a pneumatic jack with diaphragm, carrying a pneumatic nozzle at the end of its axis. The movements of the jack correspond to the variations in the surface being monitored, which are measured by a motion pick-off with a differential transformer fixed on the rear of the sensors. Preferably at least two of these sensors are arranged symmetrically on either side of the wire, perpendicularly to the axis of the latter. They permit making measurements without any other contact with the wire other than that of the air jet at a very low pressure coming out of the pneumatic nozzle.

Moreover, the transducer is not necessarily placed between the manometer or the flowmeter and the comparator as shown in FIGS. 2 to 4. It may also be placed after the latter in such a way as to convert into an electrical variable the result of the comparison made, either between the flow rate or the pressure measured and a reference value or between two simultaneous measurements of pressure or flow rate, in such a way as to deliver a signal to the control unit 15.

Devices such as those described above not only have the advantage of being accurate, of being able to be mounted at the immediate outlet of the machining zone and of showing short response times and permitting a reliable determination of the degree of wear on the wire without the measurements being interfered with by the twisting of the wire around its axis and by its temperature rise, but also that of being simple, inexpensive and capable of being mounted very easily on existing EDM machines.

Indeed, the measurement elements used in the present invention might for example be incorporated into existing wire guides or else on the injection nozzles for the machining fluid already incorporated into the machining heads of present-day EDM machines.

Thanks to them an imminent breaking of the wire as a result of a deterioration in the machining conditions can be foreseen effectively and this breaking can be quickly and automatically prevented by changing one or more machining parameters. The duration of the automatic operation and the productivity of the EDM machine are substantially increased because action by the operator or making use of an automatic rethreading device is no longer necessary, and stoppages due to a break in the wire are avoided.

Moreover, since there is no direct contact between the barrels of the outflow gauges, the rings of the sensors and the wire, the measurement element has no effect on the variable measured. Since the devices according to the present invention exert no friction on the wire, they are not the cause of any extra wear. The measurements may be made continuously without drawbacks.

The devices of the present invention thus make it possible to regulate during machining the parameters conditioning the latter, and to optimize it while continuing good machining, with the best possible yield, but without risking breaking the wire as a result of too powerful electroerosion discharges for example, and while choosing the most appropriate machining conditions.

We may also add that it is all the more useful to evaluate the degree of wear on a wire used as an electrode in electroerosion to the degree that this wire is more and more often a stratified wire composed of a number of layers of metal and in some cases of alloys and metal oxides. Therefore it is very important to foresee or detect and prevent the disappearance by wear of the surface layer of a stratified wire by a quick change in the machining parameters, because in this way a violent deterioration of the machining is avoided.

I claim:

1. A device for preventing the breaking of a metal wire passing between two guide heads, said device comprising:
    means for evaluating the wear on said wire by monitoring the variation with time of a cross-section of the wire at an outlet of the machining zone, said means for evaluating further comprising;
    means for holding fluid under pressure arranged at said outlet of said machining zone; said means for holding having at least one opening for accepting said wire;
    means for injecting fluid under pressure through said means for holding fluid;
    means for measuring an outflow of fluid through said opening of said means for holding; and
    at least one comparator for comparing a measurement of said outflow of fluid to a predetermined reference value,
    at least one apparatus for sending a signal for controlling at least one machining parameter, said apparatus automatically sending said signal in response to a predetermined relationship between said outflow measurement and said predetermined value established in said at least one comparator.

2. The device as claimed in claim 1, having at least one transducer for converting into an electrical variable said outflow measurement.

3. The device as claimed in claim 1, having a first outflow gauge equipped with two barrels through which said wire passes and arranged at said outlet of said machining zone.

4. The device as claimed in claim 1 in which the means for injecting fluid is arranged for injecting fluid at a constant flow rate, and said means of measuring an outflow of fluid comprises a manometer measuring the pressure prevailing in said first gauge.

5. The device as claimed in claim 3 in which said means for injecting fluid is arranged for injecting fluid at a constant pressure, and said means for measuring an outflow of fluid comprises a flowmeter measuring the flow fluid circulating through said first gauge.

6. The device as claimed in claim 4 having a second outflow gauge equipped with two barrels through which said wire passes and is arranged at an inlet of the machining zone, means for injecting fluid under pressure in said first gauge, means for measuring the outflow of fluid in said first gauge simultaneously with the pressure of fluid in said first gauge and a second transducer connected with said comparator.

7. The device as claimed in claim 1, wherein said at least one opening is formed in a barrel.

8. The device as claimed in claim 1 in which said signal delivered is suitable for decreasing the power of the electrical discharges produced by a pulse generator of an EDM machine.

9. The device as claimed in claim 1 in which said signal delivered is suitable for acting on the unthreading speed of said wire, said unthreading speed being the time of passage of said wire through said machining zone.

10. The device as claimed in claim 8, in which said signal delivered is suitable for decreasing the intensity of the electrical discharges produced by said pulse generator of said EDM machine.

11. The device as claimed in claim 1, wherein said at least one opening is at least two calibrated openings.

12. The device as claimed in claim 1, wherein said at least one opening is one ring with jets.

13. The device as claimed in claim 1, wherein said at least one opening is two sensors arranged symmetrically on either side of said wire.

14. The device as claimed in claim 1, wherein said means for holding fluid comprises a case.

15. The device as claimed in claim 1, wherein said means for holding fluid further comprises a vessel.

16. A process for preventing the breaking of a metal wire passing under tension between two guide heads, said process comprising the steps of:
    passing said wire through a means for holding pressurized fluid, arranged at an outlet of a machining zone;

measuring an outflow of fluid passing through an opening for accepting said wire;
comparing said measurement of outflow of liquid to a reference value to determine the cross-section of said wire; and,
changing at least one machining parameter when said cross-section of said wire reaches a given threshold.

17. The process as claimed in claim 16 further comprising the step of immersing said machining zone in a liquid.

* * * * *